US006477524B1

(12) United States Patent
Taskiran et al.

(10) Patent No.: US 6,477,524 B1
(45) Date of Patent: Nov. 5, 2002

(54) METHOD FOR STATISTICAL TEXT ANALYSIS

(75) Inventors: Cuneyt Taskiran, West Lafayette, IN (US); Richard Qian, Camas, WA (US)

(73) Assignee: Sharp Laboratories of America, Incorporated, Camas, WA (US)

( * ) Notice: Subject to any disclaimer, the term of this patent is extended or adjusted under 35 U.S.C. 154(b) by 0 days.

(21) Appl. No.: 09/468,508

(22) Filed: Dec. 21, 1999

Related U.S. Application Data

(60) Provisional application No. 60/149,778, filed on Aug. 18, 1999.

(51) Int. Cl.$^7$ .............................................. G06F 17/30
(52) U.S. Cl. ..................... 707/2; 707/3; 707/4; 707/5; 707/6
(58) Field of Search .............................. 707/2, 3, 4, 5, 707/6

(56) References Cited

U.S. PATENT DOCUMENTS

| | | | | |
|---|---|---|---|---|
| 5,491,557 A | * | 2/1996 | Nakajima et al. | 358/296 |
| 5,675,710 A | * | 10/1997 | Lewis | 707/4 |
| 5,675,819 A | * | 10/1997 | Schuetze | 707/4 |
| 5,721,902 A | * | 2/1998 | Schultz | 707/4 |
| 5,926,811 A | * | 7/1999 | Miller et al. | 707/5 |
| 6,006,225 A | * | 12/1999 | Browman et al. | 707/5 |
| 6,128,613 A | * | 10/2000 | Wong et al. | 707/7 |
| 6,144,958 A | * | 11/2000 | Ortega et al. | 707/5 |
| 6,169,986 B1 | * | 1/2001 | Browman et al. | 707/5 |
| 6,189,002 B1 | * | 2/2001 | Roitblat | 707/1 |

OTHER PUBLICATIONS

Mitra, et al. Improving Automatic Query Expansion, *ACM SIGIR Conference on Research and Development in Information Retrieval*, pp. 206–214, Melbourne, Australia 1998.
Gauch, et al. Corpus Analysis for TREC 5 Query Expansion, *Fifth Text Retrieval Conference (TREC–5)*, Gaithersburg, MD 1996.
Smeaton, et al. TREC–4 Experiments at Dublin City University: Thresholding Posting Lists, Query Expansion with WordNet and POS Tagging of Spanish, *Fourth Text Retrieval Conference (TREC–4)*, Gaithersburg, MD, Nov. 1995.
Buckley, et al. Automatic Query Expansion Using SMART: TREC–3, *Fourth Text Retrieval Conference*, Gaithersburg, MD, Nov. 1995.
Abberley, et al. Retrieval of Broadcast News Documents with the THISL System, ICASSP '98, Seattle, WA.
Charkravarthy, A. Information Access and Retrieval with Semantic Background Knowledge, Ph.D. Thesis, MIT, 1995.

* cited by examiner

*Primary Examiner*—Frantz Coby
(74) *Attorney, Agent, or Firm*—Marger Johnson & McCollom, P.C.

(57) ABSTRACT

A method for retrieving relevant stories from a collection of stories. The method comprises the steps of identifying at least one query term, applying a cooccurrence matrix to the query term to provide a list of query terms, determining if a story in the collection contains any terms on the list of query terms, and then increasing a relevance measure if the story does contain words on the list of query words. If the relevance measure is higher than a threshold, the story is added to a list of relevant stories.

9 Claims, 4 Drawing Sheets

METHOD FOR STATISTICAL TEXT ANALYSIS

This invention is a continuation of, and claims priority from, U.S. Provisional Patent Application No. 60/149,778, filed Aug. 18, 1999.

BACKGROUND OF THE INVENTION

1. Field of the Invention

This invention relates to method of analyzing text for relevant content, more particularly for statistical methods for performing text analysis.

2. Background of the Invention

One of the most prevalent uses of text analysis today is by search engines on the Internet. These search engines take key words and search for relevant articles, web sites and discussions that include those words. The articles, web sites and discussions will be referred to hereinafter as stories. The use of text analysis also occurs in other types of text searching, such as computerized reference collections, electronic libraries and document management systems.

One challenge unique to the Internet is that content is being added to the collection of stories almost continuously. The number of stories that might have relevance to an inquiry can overload the user and bog down the system used for searching. This is especially true in view of the current methods for text searching employed by search engines and other types of text searching tools.

A current technique for text searching is shown in prior art FIG. 1. The query term is obtained in some manner, such as from a user entry or a user profile. If the query term is a single word, the story is searched for occurrences of that term. If the query term is a phrase, the story is searched for occurrences of each word of the phrase.

For single word query terms, a match results in the story being added to the list of stories that are relevant to the query. If the query term is a phrase, stories with each word of the phrase are added to a preliminary list associated with that word. An intersection of the preliminary lists is taken and those stories that are at the intersection of the preliminary lists (i.e., stories that contain all the words in the query phrase) are added to the list of stories that are relevant. A major drawback to this approach is that relevant stories may not contain the exact term. This problem is exacerbated when the information retrieval is based upon very concise documents, such as user profiles, and when the information itself is in the form of brief summaries such as news summaries that can be found at an Internet portal site like yahoo.com.

One way to overcome this problem is to add new terms to the original query that are related to the original terms. This task can be performed manually, but requires considerable expertise, both in searching and in the area being queried, an expertise most users lack. Performance of this task automatically falls under the category of Automated Query Expansion (AQE). There are three main approaches to AQE in the current literature.

The first approach is to use an online (electronic) thesaurus or dictionary such as WordNet. WordNet is a large, manually built, general-purpose semantic network, which models the lexical knowledge of a native English speaker. It is organized around groupings of words called synsets. Each synset contains synonymous words and relationships among them. The relationships take the form of IS-A, A-KIND-OF, etc. For example, using the relationship "a snake is A-KIND-OF animal," a query using the word snake may expand to include the word animal.

Discussion of these types of approaches can be found in "TREC-4 Experiments at Dublin City University: Thresholding Posting Lists, Query Expansion with WordNet and POS Tagging of Spanish," by Smeaton, et al., published in Fourth Text Retrieval Conference (TREC-4), Gaithersburg, Md., Nov. 1–3, 1995, (Smeaton) and "Information Access and Retrieval with Semantic Background Knowledge," by A. Chakravarthy, Ph.D. Thesis, MIT, Boston, Mass., 1995 (Chakravarthy).

A second category of AQE involves a pairwise association measure between words. The given corpus is analyzed to determine pairwise word associations and a query term is expanded to include terms having association values greater than a certain threshold. In one example, a pairwise mutual information value is determined from the context vectors of frequent words in the corpus. This example is discussed in "Corpus Analysis for TREC 5 Query Expansion," by Gauch, et al., in Fifth Text Retrieval Conference (TREC-5), Gaithersburg, Md., 1996 (Gauch).

The third category of AQE uses blind relevance feedback in accordance with Rocchio's algorithm. Blind feedback refers to the fact that relevance is not judged by the user but is determined by the system automatically. An initial search for the original query is performed and the retrieved documents are sorted according to some measure. The top few documents are assumed to be relevant for the original query. The original query is then expanded by using the terms in these relevant documents.

Articles discussing this approach include Mitra, et al. "Improving Automatic Query Expansion," ACM SIGIR Conference on Research and Development in Information Retrieval, pp. 206–214, Melbourne, Australia, 1998 (Mitra); Buckley, et al. "Automatic Query Expansion Using SMART: TREC-3," Fourth Text Retrieval Conference, Gaithersburg, Md., 1994 (Buckley); and Abberley, et al. "Retrieval of Broadcast News Documents with the THISL System," ICASSP '98, Seattle, Wash., 1998 (Abberley).

However, all of these techniques still have serious drawbacks. A general-purpose database like WordNet has large coverage gaps when used for domains with their own specific vocabularies and sublanguages. Technology business news, for example, or technology advancements in highly jargon-filled technologies will have their own terms not recognized by general-purpose databases. It would be prohibitively time consuming to create a semantic network or to add terms to WordNet for each possible domain.

Another problem with the above approaches occurs with ambiguous terms. For example, the word "bank" may result in an expansion on rivers or an expansion on financial matters. Finally, methods using blind feedback are promising and are currently very popular. However, when the number of documents in the database is low, and/or is of short length, blind feedback runs into problems.

Pairwise association techniques such as the one discussed above usually use a symmetric cooccurrence matrix of words. In a symmetric matrix, the occurrence of one word of the pair triggers an expansion to include the other word. This can be problematic when one word is fairly common. For example, the use of the word cellular in a query would result in the expansion to include the word phone. This is probably not inaccurate because cellular commonly refers to phones. However, the use of a symmetric matrix results in the addition of the word cellular whenever the word phone is used. Given that phone is a fairly common word, this could result in an unnecessary expansion and irrelevant results. An example of an approach using this type of matrix is shown in U.S. Pat. No. 5,675,819, issued Dec. 7, 1995.

Other types of query expansion techniques have also been patented. U.S. Pat. No. 5,926,811, issued Jul. 20, 1999, forms a statistical thesaurus. However, the techniques used are not as sophisticated or exacting as those using pairwise associations or matrices. Finally, a method tagging speech by identifying the part of speech of a given word is shown in U.S. Pat. No. 5,721,902, issued Feb. 24, 1998.

Therefore, a method for more accurate query expansion that takes into account such things as asymmetrical pairwise word associations and domain-specific words and phrases is needed.

SUMMARY OF THE INVENTION

One aspect of the invention is a method for retrieving relevant stories from a collection of stories. The method includes the steps of identifying at least one query term, and applying a cooccurrence matrix to the query term to provide a list of query terms. Then, it is determined if a story in the collection contains any terms on the list of query terms. If the story does contain words in the list of query words, a relevance measure is increased. If the relevance measure is higher than a threshold, the story is added to a list of relevant stories.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
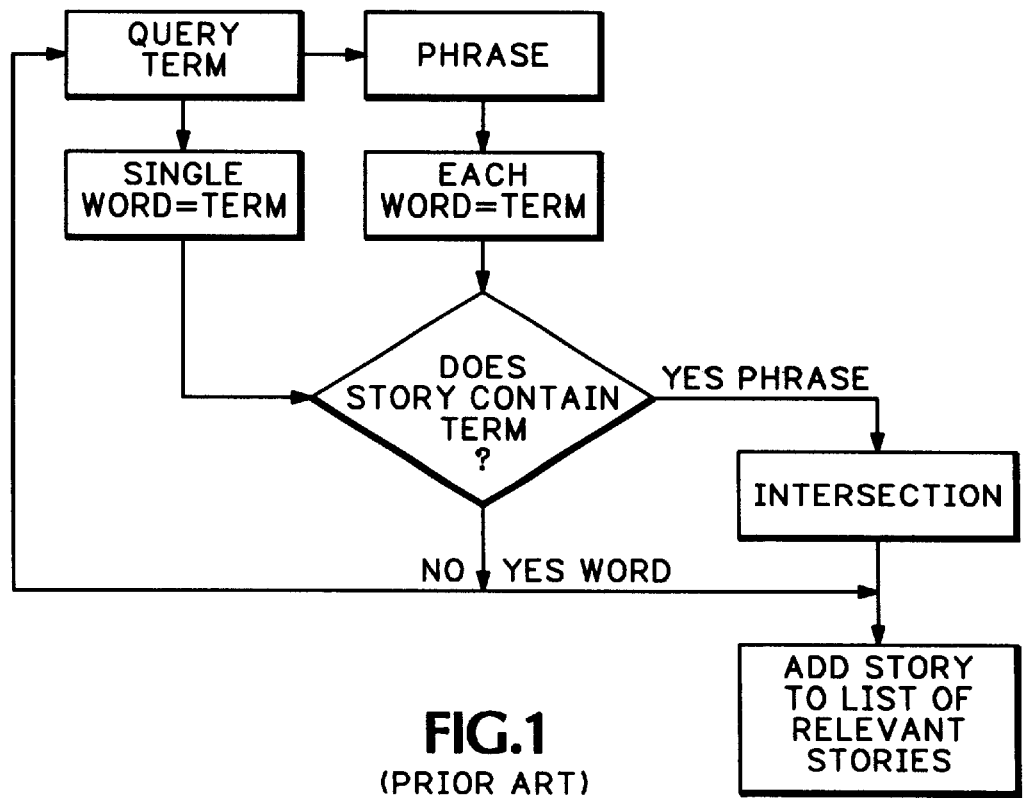
FIG. 1 shows a flowchart of a prior art approach for text retrieval.
Figure 2:
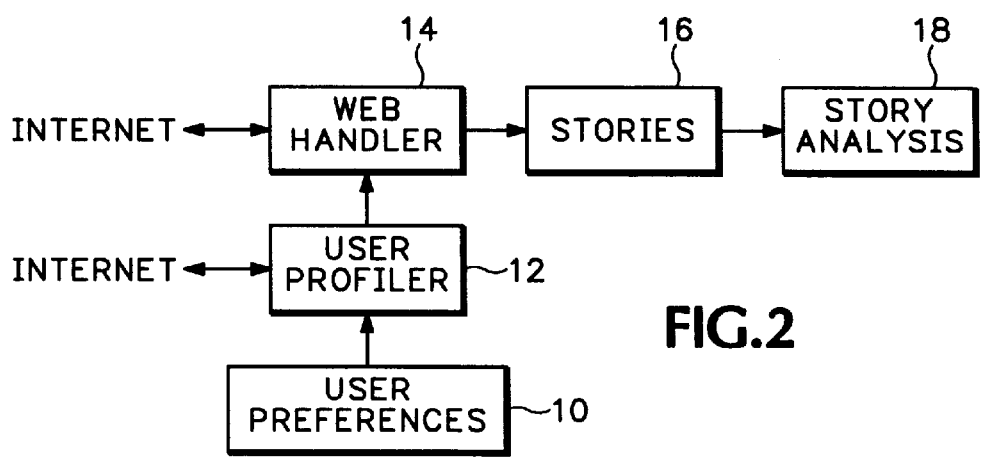
FIG. 2 shows a block diagram of a system in which text retrieval is used, in accordance with the invention.

A system employing methods of the invention is shown in block diagram form in FIG. 2. In this example, user preferences 10 are used by the user profiler module 12 to develop, update and track a user profile. The user profiler may use both direct user inputs, a smart agent that forms user preferences automatically on the basis of user's usage pattern, both or neither. The user profiler develops a list of web addresses that are of interest to the user.

The user profile is then provided by the user profiler to the web handling module 14. The web handling module 14 fetches the web pages, parses them, and processes them to segment out the stories 16. The web handler may interact with the user profiler module to provide feedback on the relevance of a particular web site. The web handler 14 passes the stories it locates 16 to the story analysis module 18.

Figure 3:
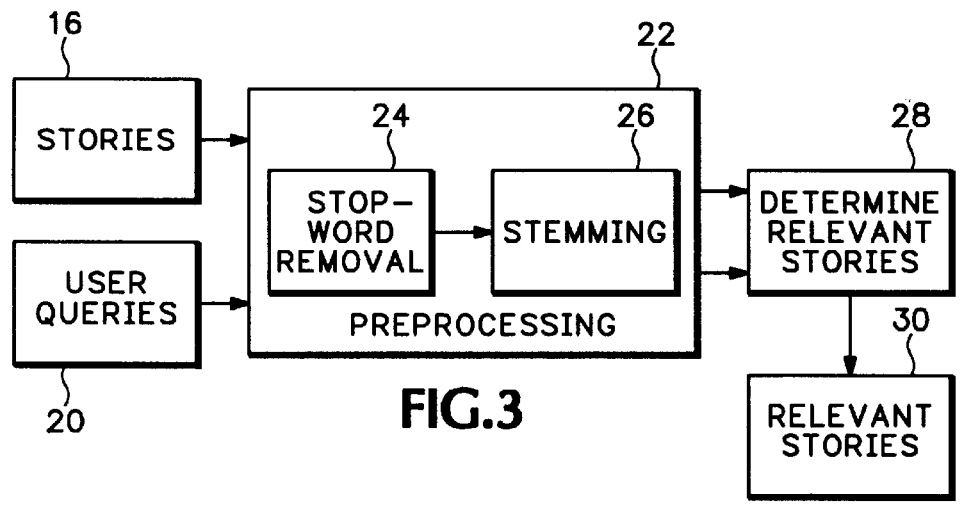
FIG. 3 shows an expanded block diagram of story analysis for a text retrieval sytem, in accordance with the invention.

FIG. 3 shows an expanded view of the story analysis module 18. The stories and user queries 20, either from the user profile or from direct user inputs, are used as initial inputs to the module. In the preprocessing module 22, stop-word removal is performed to remove generic and commonly used terms, such as the days of the week and the months of the year. It must be noted that if the user query includes those terms, such as an event that happened on the first Tuesday in May, the user query would override the stop-word removal process for those words.

The stop-word removal module 24 provides one way in which the system can adapt to particular domains. For example, a stop-word list for entertainment news would probably differ greatly from a stop-word list for technology news. Additionally, a generic stop-word list can be supplemented with words from relevant domains, making them more accurate and resulting in higher relevance stories.

The second part of preprocessing in this example includes stemming 26. Stemming refers to the process of reducing words to their core by removing, for example, suffixes due to tenses in a verb. For instance, the words "processed" and "processing" are stemmed to "process". There algorithms in the literature. Once the preprocessing is completed, relevant stories are determined at module 28. The method of determining relevant stories will be discussed in more detail with reference to FIGS. 4 and 5. After a story is determined to be relevant, it is added to the relevant stories list 30. These are then identified to the user.

In general, the method of determining the relevant stories at 28 uses a pairwise association approach. One of the weaknesses of current approaches, as discussed previously, is that they only consider a predetermined number of highest frequency terms in a corpus. For smaller corpus with diverse context, the approach is not feasible. Use of conditional probabilities will result in more accurate and reliable associations. The pairwise association values are formed in an asymmetrical matrix, referred to as a cooccurrence matrix.

Further, current approaches do not exploit higher order information contained in the matrix. For example, if the term A is associated with the term B, and B is associated with C, a second order association exists between A and C. These are typically not used in the current literature, as they require intensive computations to derive them directly from the corpus. Aspects of the invention include extracting and utilizing higher order information contained in the matrix. The matrix itself then contains higher order information about multiple word cooccurrences when term relationships in the matrix are interpreted as those of a directed graph. Various graph-theoretic methods may be applied to analyze the structure of the matrix.

Most text retrieval algorithms are trained using a large collection of relevant text. Unfortunately, for information filtering applications (e.g., filtering of news summaries) domain content is not fixed and may change drastically over time. In addition, large collections may not be available. Updating the matrix periodically using the gathered stories will be used to solve this problem.

In addition, updating the matrix will provide the user with help in specifying queries. A list of dominant words for a particular domain will be determined using techniques such as Singular Value Decomposition on the cooccurrence matrix and let user choose from among these and related words to construct their queries.

Figure 4A:
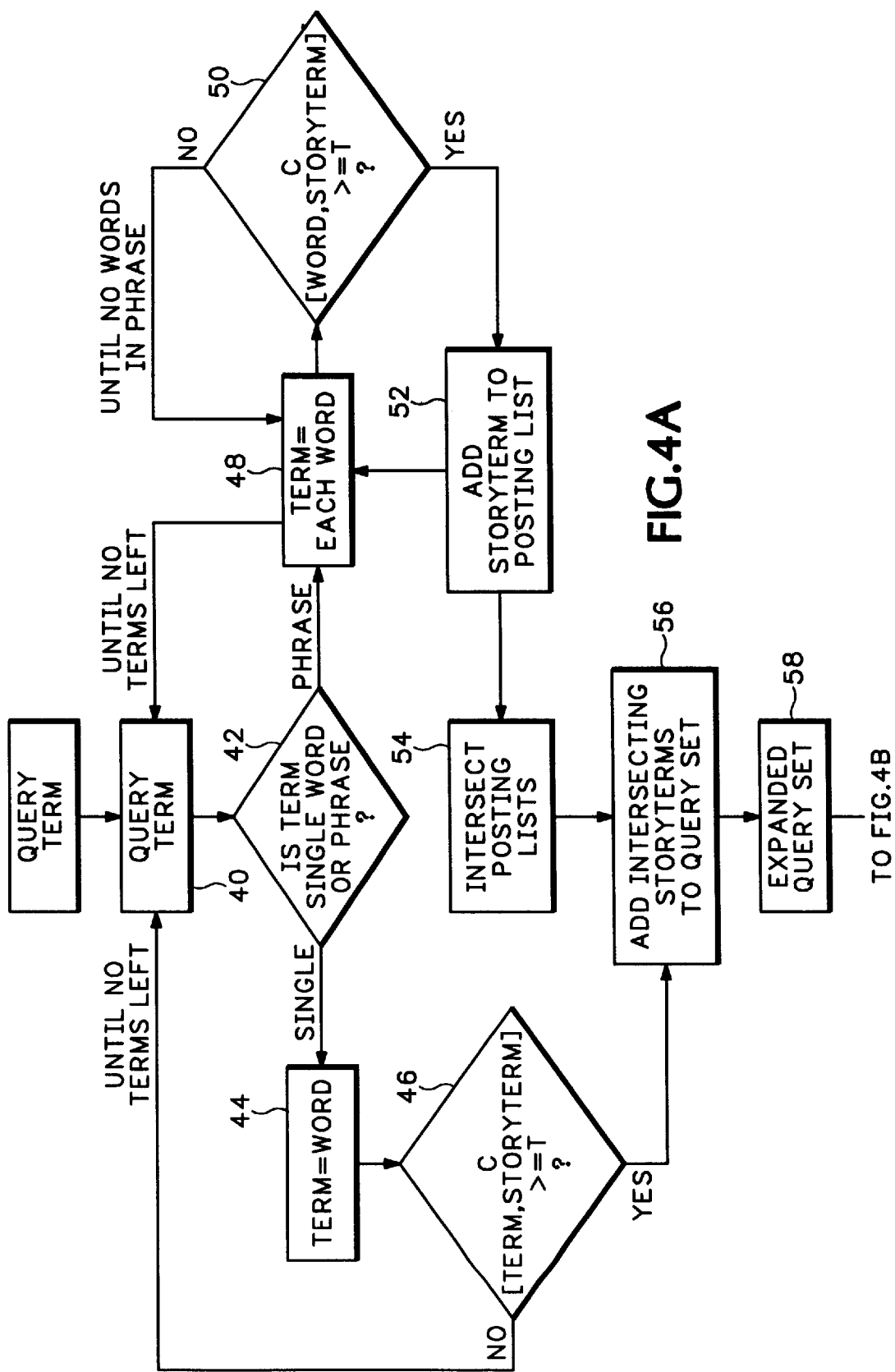
FIG. 4 shows a block diagram of one embodiment of a method for text retrieval using automated query expansion and searching in accordance with the invention.
Figure 4B:
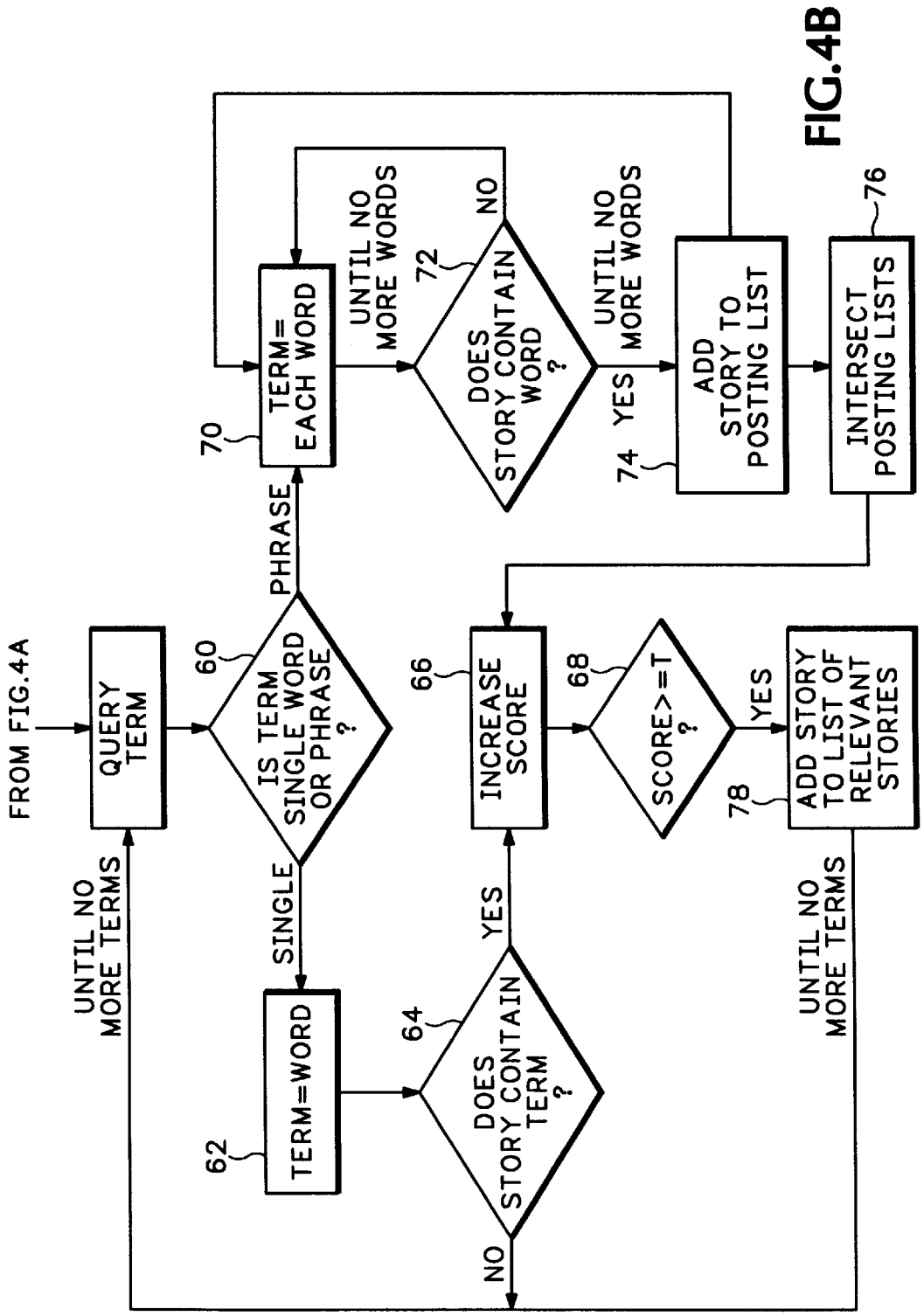

Having discussed in general terms the parameters in which the matrix should function; a specific example is given to further demonstrate the use of such a matrix to a text retrieval system. One embodiment of a method for query expansion and story identification is shown in FIG. 4, as an example to promote understanding of the invention.

As discussed previously, the process starts with identification of a query term at 40. Because some query terms may actually be phrases, single word query terms and phrase query terms have to be accounted for. At step 42, the determination is made whether the term is a single word or a phrase. If the query term is a single word, the process moves to step 44 and the term to which the cooccurrence matrix is applied is set equal to the single word. If the query term is a phrase, the term to which the cooccurrence matrix will be applied is set equal to each word in the query term at step 48. The words against which these terms are checked in the matrix will be referred to as storyterms.

At steps 46 and 50 the cooccurrence matrix is applied to determine if there are other words that should be used to expand the query. The difference between the two steps is that at step 46 the entry to be analyzed is [term, storyterm] and at step 50 the entry is [word,storyterm]. This terminology will be explained below.

In order to understand the cooccurrence matrix, the following definitions will be used. S is a collection of documents or stories containing N terms of which T are distinct after stop-word removal and stemming. The quantity $n_i$ is the number of occurrences of the term i in the collection S, and $n_{ij}$ is the number of occurrences of the terms i and j in the same document. The measure of association of j with i would then be defined as:

$$\alpha_{ij} = \frac{n_{ij}}{n_i}.$$

This association value defined above is an estimate of the conditional probability of observing the term j given the term i.

$$\alpha_{ij} = \frac{n_{ij}}{n_i} = \frac{\frac{n_{ij}}{N}}{\frac{n_i}{N}} = \frac{P(\text{observing } i \text{ and } j)}{P(\text{observing } i)} = P(j|i)$$

The cooccurrence matrix is then defined as:

$$C(i,j)=\alpha_{ij}$$

Note that C is not symmetric, as would have been the case if cooccurrence counts were used as entries. The association relation used in not symmetric, i.e., $\alpha_{ij} \neq \alpha_{ji}$. Using the example of the terms cellular and phone discussed previously, it is useful to explain this aspect of the cooccurrence matrix.

For example, the word cellular appears in a collection of stories 4 times. The term phone appears 22 times. They occur together 4 times, which means that every time the word cellular appears, the word phone also appears. Therefore the association $\alpha_{[cellular, phone]}$ is 4/4, or 1. The association $\alpha_{[phone, cellular]}$ is 4/22, or 0.182. Therefore, if the word cellular appears in a query, it is a good idea to add phone, but not the reverse. In this manner the query can be appropriately expanded.

It is important for the entries in the cooccurrence matrix to be accurate, in the sense of reflecting true or asymptotic values for the associations. It may happen that $\alpha_{[phone, cellular]}$ is low because there are few stories containing the term cellular phone. This problem is currently solved by creating a large collection of representative documents to train the algorithms. For some applications, however, such as news stories that vary in content so drastically, it is impossible to come up with one collection that captures most of the terms. It is believed that the preferred approach would be to update the cooccurrence matrix frequently, every day or every few days, using new stories.

The Weak Law of Large Numbers guarantees that the estimates will converge to the 'true' probabilities as N gets large. The size of the matrix is an important factor in the running of the processes. C will be a T×T matrix, where T is the number of distinct terms in the collection. As N gets large, the concern would be that T would increase to the point of being impractical. However, the rate of increase for T will be much slower than the rate of increase of N. An example of this relationship could be shown as:

$$T=kN^\beta.$$

Typical values for k are between 10 and 20, and for β between 0.5 and 0.6. As the text size increases the number of new words will rapidly become smaller. The rate of increase of T will be much slower than the rate of N.

All of these considerations result in a cooccurrence matrix that can be used to perform query expansion. Returning now to FIG. 4, the value of the matrix for the term is determined and compared to a threshold at steps 46 and 50. If the value is higher than the threshold, each kind of term, whether single word or phrase is handled to expand the query.

If the term is a single word and the cooccurrence value is above the threshold at step 46, that term is added to the query at step 56. If the term is a phrase, for each word in the phrase an association value is determined from the cooccurrence matrix with each storyterm. If the association value is above threshold, at step 50, that storyterm is added to the posting list associated with that word at step 52. This is repeated for each word in the phrase resulting in a posting list for each word. Once all the words in the phrase have been analyzed, the resulting posting lists are intersected at step 54. Storywords that intersect from the posting lists, i.e., the contents of the intersection set of the posting lists, are added as terms to the query at step 56, thus expanding the query.

At step 58, the actual story searching begins, using the expanded queries. Again the process splits at step 60 based upon the nature of the query terms, which now include the additional expansion terms. Following the single term path to step 62 and then step 64, a story is searched to see if it contains that query term. If the story does not contain the term, the process returns to step 58 to test the next term. If the story does contain the term, the score for that particular story is increased at step 66.

If the query term is a phrase, the process moves to step 70 where the term is set equal to each word in the phrase. The stories are searched at step 72. If the story does not contain that word, the process returns to step 70 until all the terms in the phrase are used. If there are no more words in the phrase, the process returns to step 58 until there are no more query terms. If the story does contain that word, the story is added to the posting list of that word at step 74. When the query is complete, the posting lists are intersected at step 76 and the stories in the intersection set have their scores increased at step 66.

In this manner, the scores for various stories indicate the relevance of that particular story to the user's profile or preferences. In some instances, a term may only occur once in the collection. This will render its association value to be either 1 or 0, and the estimate of probability becomes useless. To avoid this problem, it may be desirable to modify the process such that terms that occur just once for the collection are not expanded during query expansion.

The scoring process should also have some parameters associated with it. For example, if a query contained the word Internet and Microsoft, desirable results would have stories that contain one occurrence of both of these words rather than stories that have repeated occurrences of one word. The score would then need to be higher for those stories with the occurrence of both words, rather than a story with frequent repetitions of one word.

One method of computing the scores would be to assign the score, $s_j$, as:

$$s_j = \left(\sum_{i \in Query} n_{ij}\right) + (k-1) * w$$

The new term k is the number of terms from the query that the story contains and w is a weight. The second term being added to the first controls the problem discussed above. After the story scores are computed, at either step 66 or step 78, the stories are sorted according to their scores. Stories above a threshold at 68 are added at step 78 and presented to the user. The process continues until no more terms are left to be searched.

Figure 5:
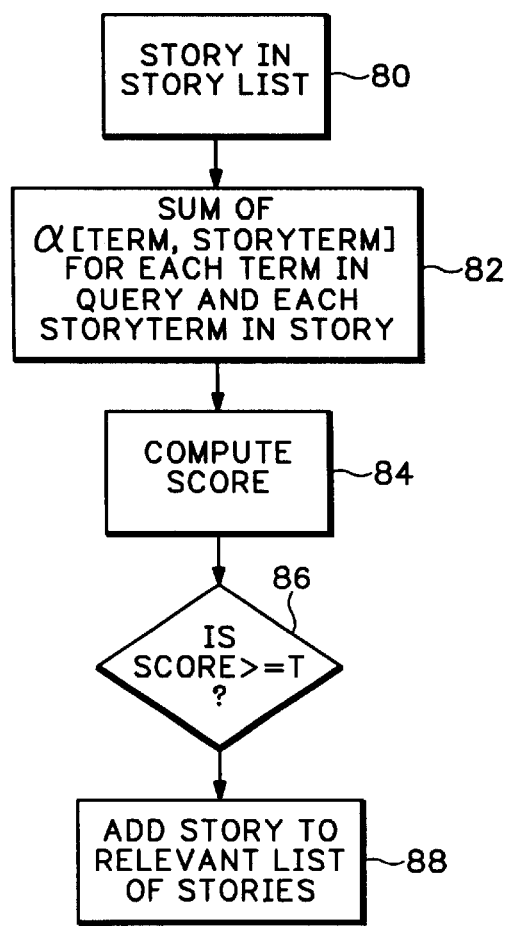
FIG. 5 shows a block diagram of one embodiment of a method for relevance scoring for stories retrieved, in accordance with the invention.

An adaptation of the above example uses a threshold to determine if a story should be presented to the user. A flow chart of one example of such a process is shown in FIG. 5. The process starts with each story in the story list at step 80. For each storyterm in the story and each term in the query the quantity $\alpha_{[term,storyterm]}$ is determined from the cooccurrence matrix and a sum is computed at step 82 of all $\alpha_{[term,storyterm]}$. At step 84, the score for that particular story is then set equal to $$\text{score(story)} = \frac{\text{sum}}{\text{number of words in story} * \text{number of query words}}$$

Once the score is computed, the story is presented to the user at step 88 if the score exceeds a threshold at step 86.

Having set out one example of a process utilizing the invention, it is now possible to discuss further adaptations and features of the invention. As mentioned previously, the use of higher order associative relationships in the matrix may increase the accuracy and efficiency of the retrieval system. Initially, a threshold value is established that sets a minimum association value.

If the associative value between two terms, such as i and j, exceeds the threshold value, a link is said to exist between these two terms such that i is linked to j. It must be noted that the matrix is not symmetric, so j is no necessarily linked to i. Having established this relationship, the cooccurrence matrix can be used as the adjacency matrix for a directed graph, with the links being the edges of the graph.

Of special interest are groups of terms that are connected in such a manner that makes it possible to go from any word within the group to another. Such a group of nodes is called a strongly connected component of the graph, in a directed graph. Locating these strongly connected components of the graph will assist in query expansion. Given a term, the query can expand to include all the terms within the same connected component as the given term, not just using the entries of the cooccurrence matrix to decide in adding a term.

The above technique will reduce the decrease in precision that occurs during query expansion. This decrease in precision occurs mostly because some words have high associative values because they are common words. Previously, the term cellular linked to phone had an associative value of 1, and phone linked to cellular had a value of 0.182. The second link can be avoided by Thresholding the values at 0.2.

Also discussed previously was the concept that the cooccurrence matrix can be used to assist the user in formulating effective queries. The implementation of this concept involves using the cooccurrence matrix to discover dominant terms in a given corpus. The cooccurrence matrix has been defined as having a dimension of T×T, where T is the number of distinct words in the collection. Usually T will be in the range of one to five thousand words. This makes C a large matrix, but it is sparse because most of the terms do not occur together.

Given this last property of the matrix, a dimensionality reduction technique may be used on C, such as Singular Value Decomposition. The SVD of C can be computed and a small number of singular values will be selected via thresholding. The components of the eigenvectors corresponding to these dominant singular values are the weights of a linear combination of all terms in the collection. Each singular value corresponds to a meta-term made up of a linear combination of the T terms. When most of these weights are relatively small, the meta-term can be said to be a subset of the original T terms. These groups for each dominant singular value are then combined to obtain a list of dominant words in the collection.

The techniques shown above are merely intended as examples of the invention. Thus, although there has been described to this point a particular embodiment for a method and structure for statistical text analysis, it is not intended that such specific references be considered as limitations upon the scope of this invention except in-so-far as set forth in the following claims.

What is claimed is:

1. A method for retrieving relevant stories from a collection of stories, the method comprising:

identifying at least one query term;

applying an asymmetrical, cooccurrence matrix to the at least one query term to provide a list of query terms;

determining if a story in the collection contains any terms on the list of query terms;

increasing a relevance measure if the story does contain words on the list of query words; and adding a story to a list of relevant stories if the relevance measure is higher than a threshold.

2. The method of claim 1, wherein identifying at least one query term further comprises using a user profile for obtaining the at least one query term.

3. The method of claim 1, wherein applying a cooccurrence matrix further comprises comparing a measure from the cooccurrence matrix to a threshold.

4. The method of claim 1, wherein the at least one query term is a single word.

5. The method of claim 1, wherein the at least one query term is a phrase and each word in the phrase is used as a query term.

6. The method of claim 1, wherein increasing a relevance measure further comprises:

determining a frequency of occurrence of the query term in the story;

comparing the frequency to a threshold; and increasing the relevance measure based upon the comparing step.

7. The method of claim 1, wherein a directed graph is used to derive higher order associative information for each term in the matrix.

8. The method of claim 1, wherein the matrix is used to assist the user in formulating a query.

9. The method of claim 1, wherein the matrix is updated dynamically on the basis of new stories.

* * * * *